United States Patent [19]

Gustafson

[11] Patent Number: 5,368,375
[45] Date of Patent: Nov. 29, 1994

[54] BELT TENSION INDICATING SYSTEM

[75] Inventor: Alan D. Gustafson, Leland, Ill.

[73] Assignee: Caterpillar Inc., Peoria, Ill.

[21] Appl. No.: 111,355

[22] Filed: Aug. 24, 1993

[51] Int. Cl.⁵ .............................................. B62D 55/30
[52] U.S. Cl. ........................................ 305/10; 305/31
[58] Field of Search .................... 305/10, 29, 31; 180/6.7, 9.1, 9.48, 9.52, 9.54, 9.56; 73/862.391, 862.451, 862.541, 862.542

[56] References Cited

U.S. PATENT DOCUMENTS

| | | | |
|---|---|---|---|
| 3,504,930 | 4/1970 | Kozowyk et al. | 280/124 |
| 3,504,931 | 4/1970 | Kozowyk et al. | 280/124 |
| 3,511,327 | 5/1970 | Schlor | 305/10 X |
| 4,650,260 | 3/1987 | Satzler | 305/31 |
| 4,840,437 | 6/1989 | Henry et al. | 305/10 |
| 4,898,257 | 2/1990 | Brandstadter | 180/9.1 |
| 4,914,960 | 4/1990 | Kordahi | 73/862.451 |
| 5,031,973 | 7/1991 | Gillet | 305/31 X |
| 5,113,710 | 5/1992 | Wolfbauer, III | 73/862.54 |

Primary Examiner—Russell D. Stormer
Attorney, Agent, or Firm—Claude F. White

[57] ABSTRACT

A belt tension indicating system for indicating the belt tension of a belt driven machine includes a belt tension indicating assembly and a hydraulic ram assembly to provide the belt tension. The hydraulic ram assembly is connected between an idler wheel of the machine and the belt tension indicating assembly. When the belt tension decreases below a predetermined value, the belt tension indicating assembly activates a switch which then activates a horn, light or other device to alert the machine operator.

20 Claims, 4 Drawing Sheets

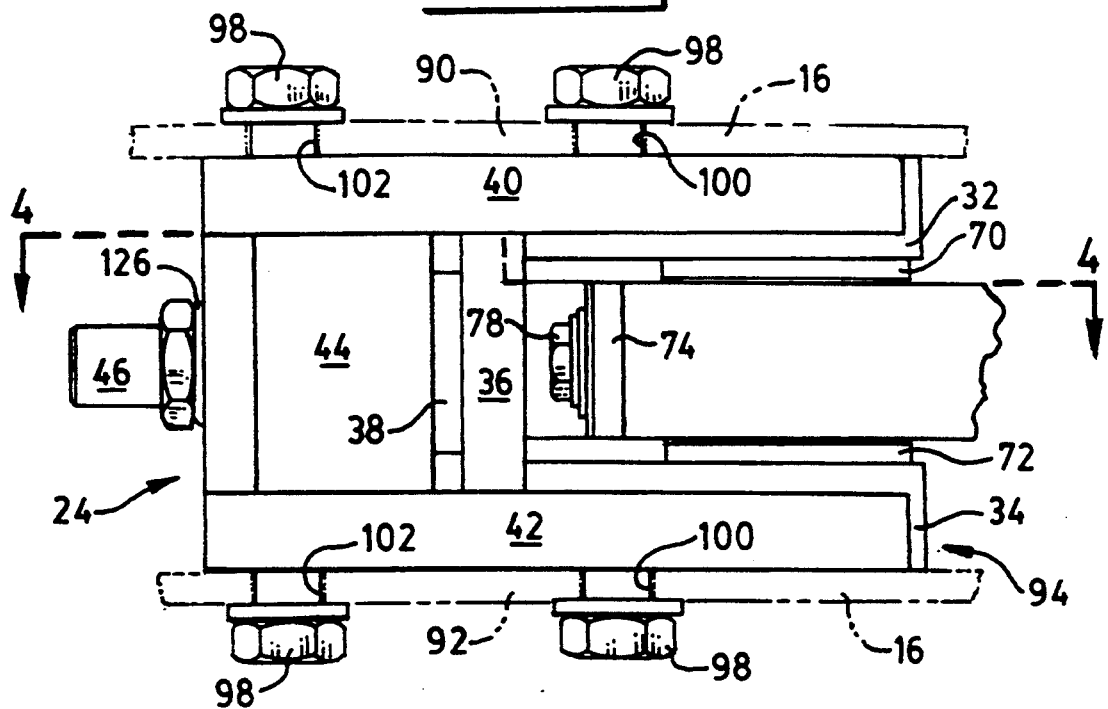
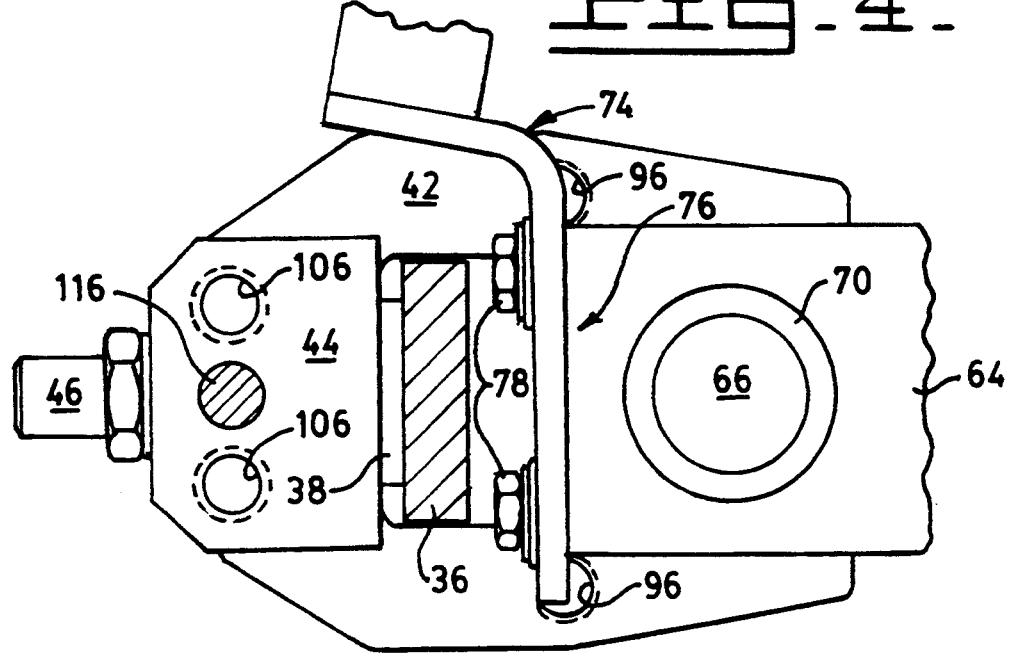

BELT TENSION INDICATING SYSTEM

TECHNICAL FIELD

This invention relates generally to work machines which are supported and driven by elastomeric inextensible belts and more particularly to a belt tension indicating system for such a machine.

BACKGROUND ART

Track-type work machines, which utilize self-laying endless track undercarriage, have many advantages over wheel type vehicles, including the provisions of lower ground pressure and increased traction. In view of this, track-type work machines can advantageously operate in wet soil areas and in soils having a large sand content. The track-type undercarriage concept has been further enhanced by replacing the heavy metal track chain with an endless flexible inextensible belt arrangement. The belt undercarriage system offers several advantages over the metal track work machines and the wheel type work machines, including higher speed, less maintenance, simplicity of design, and the ability to travel on improved roadways without damage to the road surface. The belted undercarriage system can also be applied to both powered and non-powered machines. In machine applications where the belt is driven through frictional engagement between the drive wheel and the inner surface of the belt, it is important to maintain a constant high tension force between the belt and the drive and idler wheels. In order for the work machine to operate efficiently, it is important that the work machine operator be aware of decreased belt tension.

One type of belted work machine is shown in U.S. Pat. No. 4,923,257, issued to R. J. Purcell on May 8, 1990. This patent describes a plurality of pivoting arms and fluid cylinders for maintaining the tension on the flexible belt. The load being carried by the vehicle adds to the belt tension. Belt alignment is accomplished by adding or removing one or more adjusting shims between bolted connecting joints of pivoting arms which connect to the wheel assemblies.

While the belted trailer machine described in the above noted patent will function quite satisfactory for the purpose intended, nothing is provided to alert the machine operator when the belt tension decreases for one reason or another. The present invention is directed to overcoming one or more of the problems as set forth above.

DISCLOSURE OF THE INVENTION

In one aspect of the present invention, a belt tension indicating system for a belted work machine includes an indicating assembly and means for tensioning the endless belt. The work machine includes, on each side thereof, a drive wheel, an idler wheel, and a supporting frame between the drive and idler wheel. The tensioning means has a first end connected to the idler wheel and a second end connected to the indicating assembly. The indicating assembly includes first and second securing plates, a reaction plate, a plunger block, first and second guide plates, a reaction block, and an indicating switch. The indicating assembly further includes a spring positioned to react against the plunger block.

A belted work machine offers many advantages over work machines which are equipped with steel track or wheels. These advantages include lower ground pressure, greater traction, and the ability to operate in extremely wet and/or sandy soils. However, a belted work machine having a frictionally driven belt must maintain high belt tension in order to operate efficiently. If the belt tension decreases below a predetermined value, slippage can occur between the drive wheel and the belt, with the result that the work machine will not operate to its full potential.

The subject belt tension indicating system offers a solution to the problem of low belt tension by alerting the machine operator when the belt tension decreases to a predetermined value.

BRIEF DESCRIPTION OF THE DRAWINGS

FIG. 3 is an enlarged diagrammatic plan view of the subject belt tension indicating system, taken generally along lines 3—3 of FIG. 2;

FIG. 4 is a diagrammatic plan view, partly in section, taken generally along lines 4—4 of FIG. 3;

FIG. 7 is an enlarged diagrammatic sectional view of a portion of the subject belt tensioning system shown in FIG. 6.

BEST MODE FOR CARRYING OUT THE INVENTION

Figure 1:
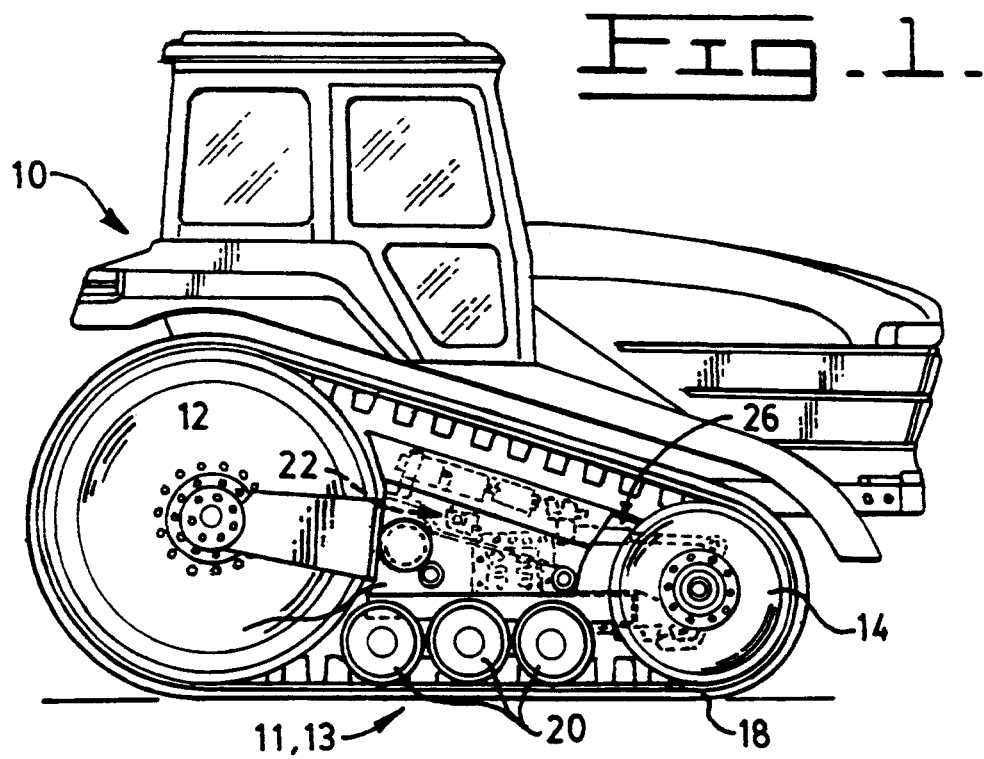
FIG. 1 is a diagrammatic side elevational view of a belted work machine incorporating the subject invention.
Figure 2:
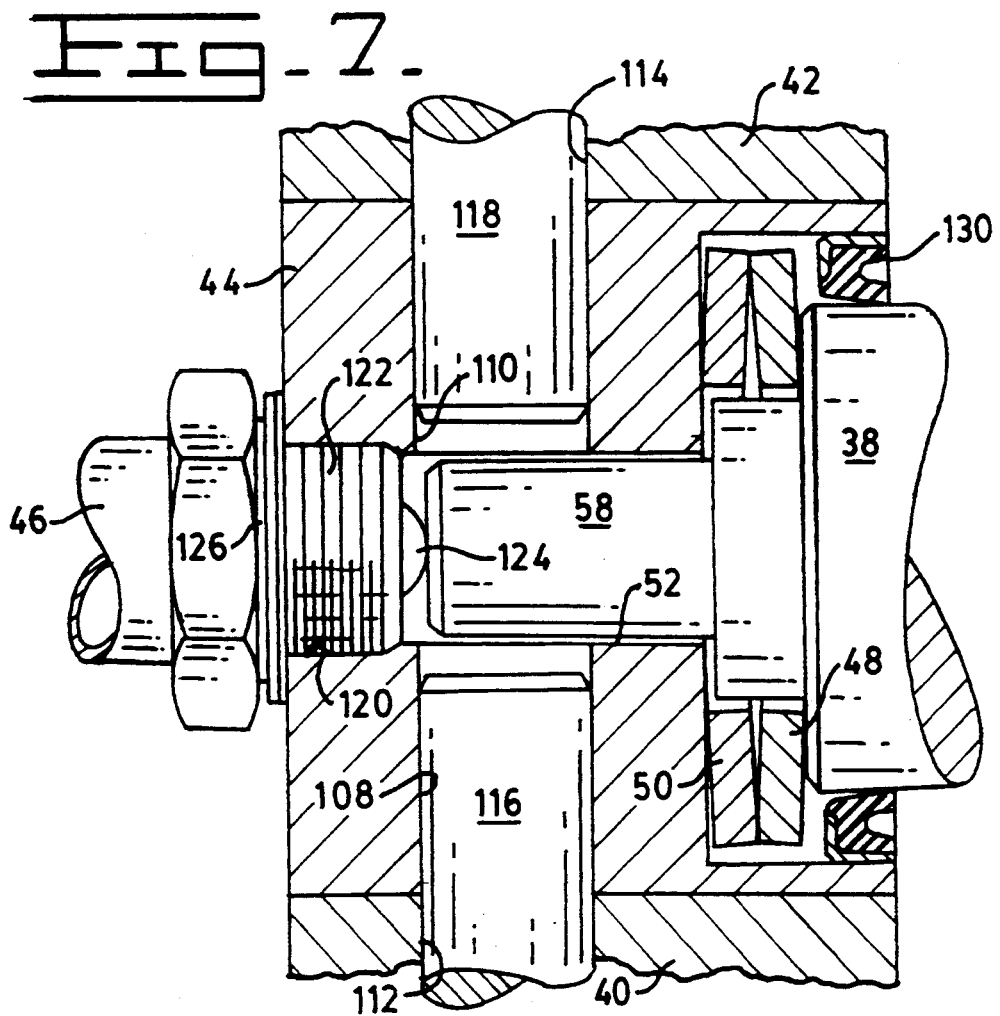
FIG. 2 is an enlarged diagrammatic side elevational view of a portion of the work machine shown in FIG. 1.
Figure 2:
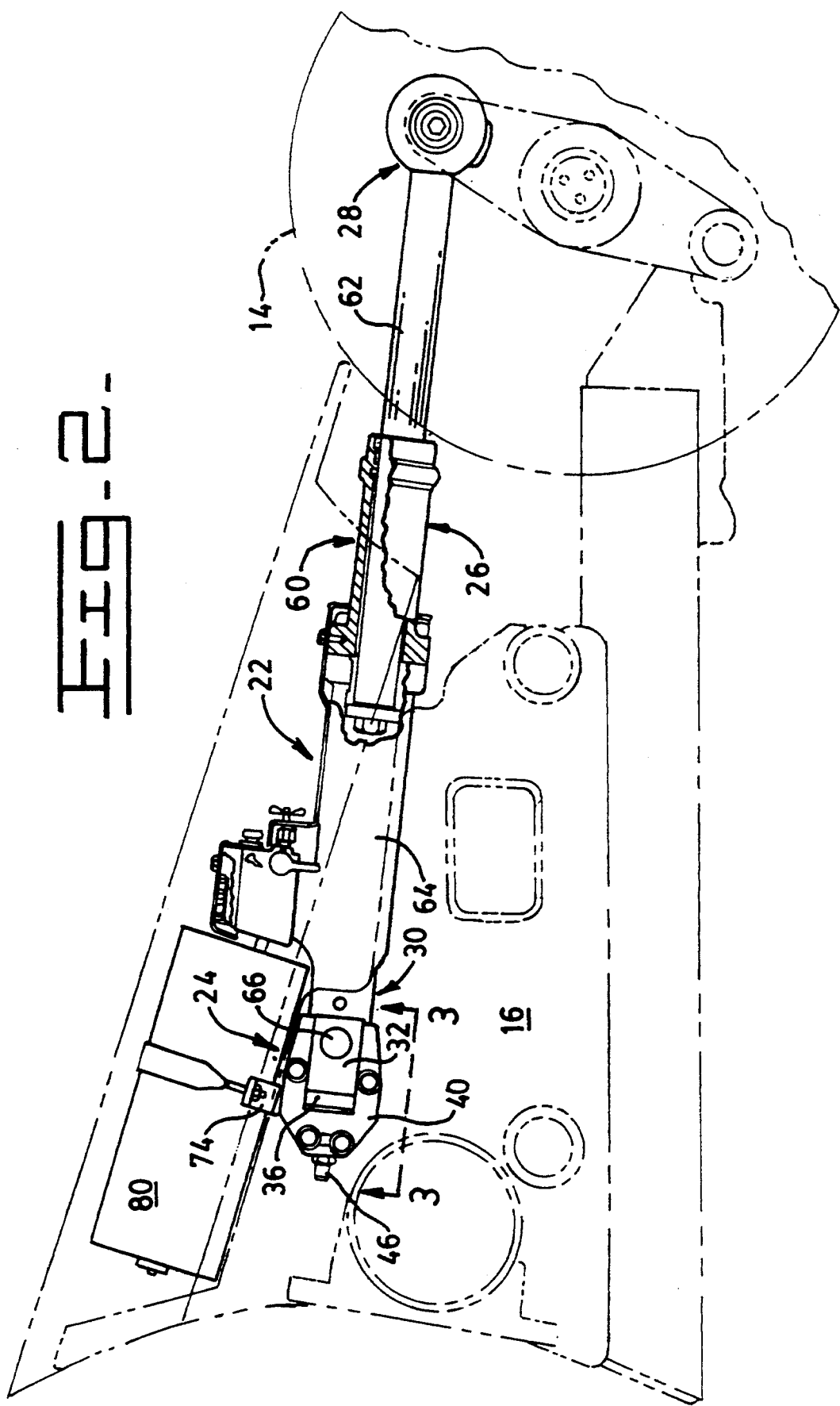
Figure 5:
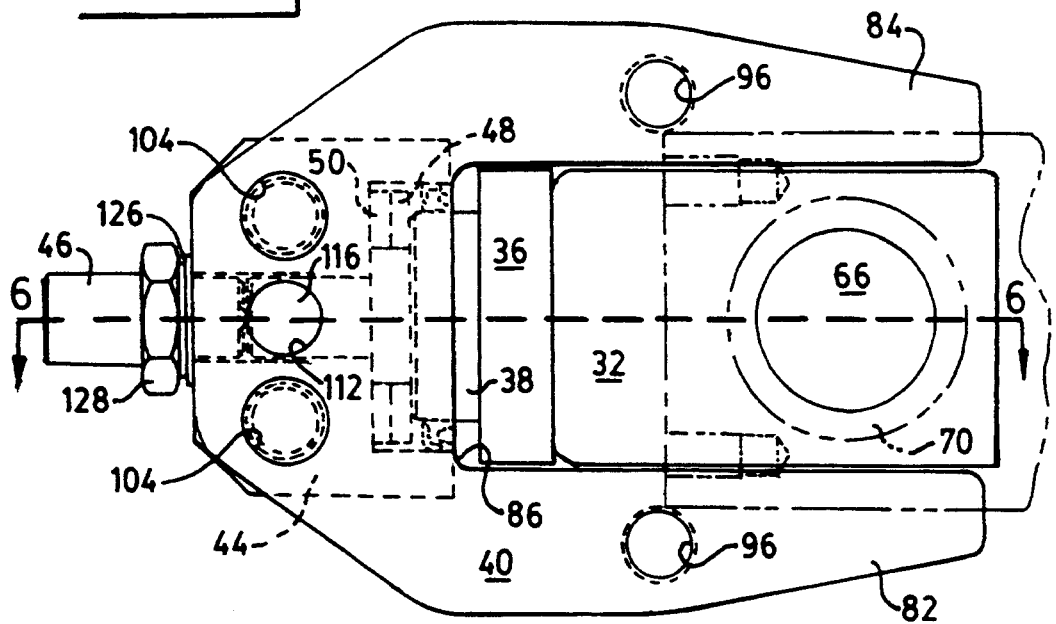
FIG. 5 is an enlarged diagrammatic side elevational view of the subject belt tensioning system.
Figure 6:
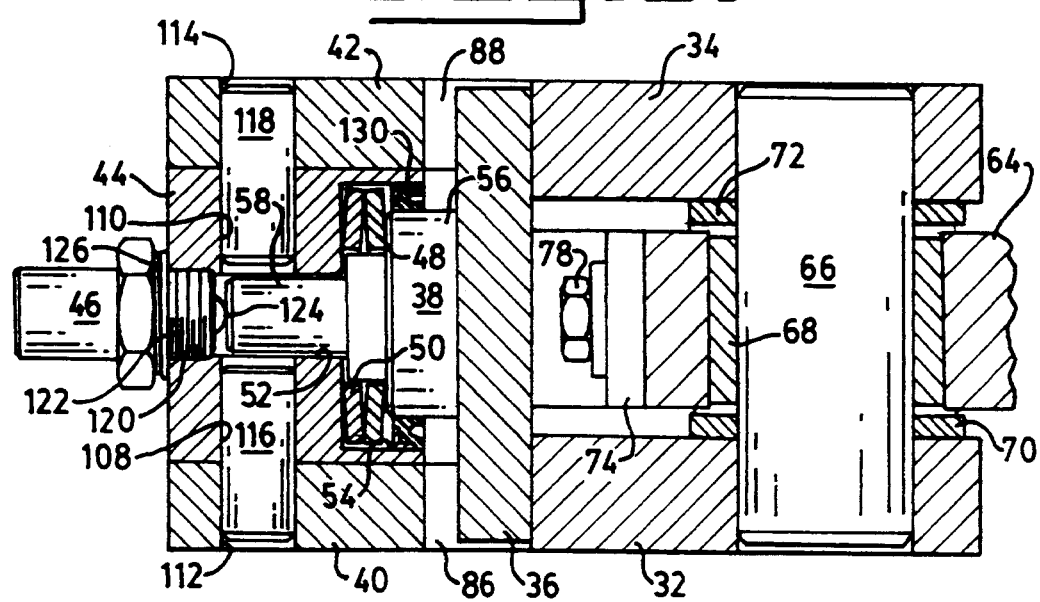
FIG. 6 is a diagrammatic sectional view, taken generally along lines 6—6 of FIG. 6.

With reference to the drawings, a belted work machine 10 includes first and second undercarriage assemblies 11,13, one on each side of the machine, each undercarriage assembly 11,13 including a drive wheel 12, an idler wheel 14, a supporting frame 16 between the drive and idler wheels 12,14, and an endless elastomeric inextensible belt 18. The belt 18 encircles the drive and idler wheels 12,14, and the supporting frame 16, and supports and drives the machine 10. A plurality of guide rollers 20 are connected to the supporting frame 16 and guide and support the belt 18 between the drive and idler wheels 12,14.

A belt tension indicating system 22 is incorporated into the work machine 10 and includes an indicating assembly 24 and a tensioning means 26. The tensioning means 26 tensions the elastomeric drive belt 18 between the drive wheel 12 and the idler wheel 14, and has a first end portion 28 connected to the idler wheel 14 and a second end portion 30 connected to the indicating assembly 24.

The indicating assembly 24 includes first and second slide blocks 32,34, a reaction plate 36, a plunger block 38, first and second C-shaped guide plates 40,42, a reaction block 44, a force actuated indicating switch 46, and first and second Belleville type springs 48,50. The plunger block 38 is adapted to be in contact with the reaction plate 36, and the indicating switch 46 is adapted to be connected to the reaction block 44. The reaction block 44 has an axial throughbore 52 and an axial counterbore 54. The plunger block 38 has a head portion 56 and a shaft portion 58 which is adapted to be positioned in the axial throughbore 52. The Belleville type springs 48,50 are adapted to be positioned within the axial counterbore 54 and between the plunger block 38 and the reaction block 44. The tensioning means 26 is adapted to compress the springs 48,50 between the head portion 38 of the plunger block 38 and the reaction block 44.

The tensioning means 26 includes a hydraulic ram assembly 60 having a rod portion 62 connected to the idler wheel 14, and a cylinder portion 64 connected to the first and second slide blocks 32,34. A retaining pin 66 and a bushing 68 is adapted to connect the cylinder portion 64 to the first and second slide blocks 32,34. First and second spacer plates 70,72 are positioned between the cylinder portion 64 and the securing plates 32,34 respectively. A bracket assembly 74 is connected to the end portion of the cylinder portion 64 by a plurality of threaded fasteners 78. The bracket assembly 74 supports an accumulator 80 which is in fluid communication with the cylinder portion 64.

The first and second C-shaped guide plates 40,42 each have first and second spaced substantially parallel leg portions 82,84. The first and second leg portions 82,84 of the first guide plate 40 define a first cavity 86 and the first and second leg portions 82,84 of the second guide plate 42 define a second cavity 88. The first securing plate 32 is adapted to be positioned within the first cavity 86 and the second securing plate 34 is adapted to be positioned within the second cavity 88. The securing plates are loosely restrained and guided by the legs 82,84 of the C-shaped guide plates 40,42.

The supporting frame 16 includes first and second spaced side plates 90,92 which define a space 94 therebetween. The indicating assembly 24 is adapted to be positioned within the space 94. Each of the guide plates 40,42 has a plurality of threaded holes 96, and a plurality of threaded fasteners 98 are adapted to penetrate aligned holes 100 in the side plates 90,92 and engage the threaded holes 96 to connect the guide plates 40,42 to the side plates 90,92. Additional threaded fasteners 98 pass through aligned holes 102 and 104 in the side plates 90,92 and the guide plates 40,42 respectively and engage threaded holes 106 in each side of the reaction block 44 to connect the reaction block 44 to the side plates 90,92. The guide plates 40,42 and the reaction block are therefore non-movably connected to the side plates 90,92 while the first and second securing plates 32,34 and the cylinder portion 64 can move axially within controlled and predetermined limits.

The reaction block 44 further defines first and second radial bores 108,110 and the first and second guide plates 40,42 define respectively first and second through holes 112,114. First and second dowel pins 116,118 are adapted to be positioned respectively within bore 108 and aligned hole 112, and within bore 110 and aligned hole 114 to connect the reaction block 44 to the guide plates 40,42.

A portion 120 of the throughbore 52 is threaded to accommodate the threaded shaft portion 122 of the indicating switch 46. As the switch 46 is threaded into the throughbore 52, a ball or plunger actuator 124 is adapted to contact the shaft portion 58 of the plunger block 38. Adjusting means 126, such as shims 126, are provided to adjust the distance between the ball actuator 124 and the plunger block 38. When the hydraulic ram assembly 60 is pressurized, the cylinder portion 64 exerts a first force through the retaining pin 66, the slide blocks 32,34 and the reaction plate 36. This force on the reaction plate 36 compresses the Belleville type springs 48,50 between the stationary reaction block 44 and the plunger block 38. A portion of the first force is applied to the ball actuator 124 through the plunger block 38 as the reaction plate 36 moves toward the reaction block 44. An electrical contact within the switch 46 is opened or closed, depending upon the relative position of the plunger 124. To prevent foreign material from interfering with the operation of the springs 48,50 and the switch 46, an annular seal 130 is positioned in the counterbore 54 and in contact with the plunger block 38 and the reaction block 44.

Industrial Applicability

With reference to the drawings, the subject belt tension indicating system 22 is particularly useful on agricultural type work machines, and more particularly on work machines which are supported and propelled by endless elastomeric track belts. Such belted machines advantageously provide good traction, low ground pressure, low soil compaction, and are able to travel on improved roadways.

The machine 10 is supported and propelled by first and second undercarriage assemblies 11,13, each including a drive wheel 12, an idler wheel 14, a supporting frame 16 having a plurality of guide rollers 20, and an endless elastomeric inextensible belt 18 which encircles the wheels 12,14 and the supporting frame 16. A self-contained hydraulic ram assembly 60 is connected at a first end portion 28 to the idler wheel 14 and is connected at a second end portion to the belt tension indicating assembly 24. The indicating assembly 24 is positioned within a space 94 between the side plates 90,92 and is connected to the side plates 90,92 by the threaded fasteners 98.

When the hydraulic ram assembly 60 is pressurized to tension the belt 18 between the drive wheel 12 and the idler wheel 14, the cylinder portion 64 exerts a first force onto the securing plates 32,34, the reaction plate 36, the plunger block 38, the springs 48,50, the reaction block 44, and the ball actuator 124. The springs 48,50 are compressed and therefore exert a counteracting force against the plunger block 38 and in a direction toward the idler wheel 14. The tensioning force applied by the hydraulic ram assembly 60 is of a magnitude sufficient to maintain an adequate frictional driving force between the drive wheel 12 and the belt 18.

If for some reason the force provided by the tensioning means 26 should decrease below a predetermined value, the frictional driving force between the drive wheel 12 and the belt 18 could be reduced. This could result in belt slippage and inefficient operation of the work machine 10. The indicating assembly will detect such a decrease in belt tension and alert the machine operator. When the pressure in the cylinder portion 64 decreases to a certain predetermined value, the first force decreases and the second force exerted by the compressed springs 48,50 moves the plunger block 38 toward the idler wheel 14. This is shown in FIG. 7 by the gap 49 between the springs 48,50. The movement of the plunger block 38 allows the ball actuator 124 to move outwardly of the switch 46 and thereby activate the switch 46. Activation of the switch will activate a horn, whistle, light or combinations thereof to alert the machine operator of the decrease in belt tension. The machine operator will then take the necessary steps to restore the tensioning force capability of the tensioning means 26. This will move the ball actuator 124 back into the switch 46 to de-activate the switch 46. Various actuating options are available in connection with activation of the switch 46, including complete shutdown of the machine 10, if so desired.

Other aspects, objects and advantages of this invention can be obtained from a study of the drawings, the disclosure, and the appended claims.

I claim:

1. A belt tension indicating system for a work machine which is supported and driven by first and second endless elastomeric inextensible belts, said work machine including on each side thereof a drive wheel, an idler wheel, and a supporting frame between said drive and idler wheels, one of said belts encircling said drive and idler wheel and said supporting frame, said indicating system comprising:
   an indicating assembly, including first and second slide blocks, a reaction plate, a plunger block adapted to be in contact with said reaction plate, first and second guide plates, a reaction block, an indicating switch connected to said reaction block, and a spring positioned between said plunger block and said reaction block; and
   means for tensioning said elastomeric drive belt between said drive wheel and said idler wheel, said tensioning means having a first end portion connected to said idler wheel and a second end portion connected to said indicating assembly.

2. A belt tension indicating system, as set forth in claim 1, wherein said spring includes first and second Belleville-type springs.

3. A low belt tension indicating system, as set forth in claim 1, wherein said reaction block has an axial bore an an axial counterbore, said plunger block has a head portion and a shaft portion, said shaft portion being positioned in said axial bore, and said spring being positioned in said axial counterbore.

4. A belt tension indicating system, as set forth in claim 3, wherein said spring includes first and second Belleville type springs, said springs being adapted to be compressed between said plunger block and said reaction block.

5. A belt tension indicating system, as set forth in claim 1, wherein said second end of said tensioning means is connected to said first and second slide blocks.

6. A belt tension indicating system, as set forth in claim 1, wherein said first and second guide plates are C-shaped and include first and second spaced parallel leg portions.

7. A belt tension indicating system, as set forth in claim 6, wherein said first and second leg portions of said first guide plate define a first cavity and said first and second leg portions of said second guide plate define a second cavity, said first slide block being adapted to be positioned in said first cavity and said second slide block being adapted to be positioned in said second cavity.

8. A belt tension indicating system, as set forth in claim 1, wherein said indicating assembly includes a retaining pin, said retaining pin adapted to secure said tensioning means to said first and second securing plates.

9. A belt tension indicating system, as set forth in claim 1, wherein said reaction block has first and second radial bores and said first and second guide plates define first and second through holes, and said indicating assembly includes first and second dowel pins, said dowel pins being adapted to be positioned respectively in said first and second radial bores and said first and second through holes, said guide plates being secured to said reaction block by said dowel pins.

10. A belt tension indicating system, as set forth in claim 1, wherein said supporting frame includes first and second spaced side plates, said side plates defining a space therebetween, said indicating assembly being adapted to be positioned within said space and connected to said side plates.

11. A belt tension indicating system, as set forth in claim 10, wherein each of said first and second side plates has a plurality of through holes, each of said through holes in said first side plate being aligned with one of the through holes in said second side plate, each of said guide plates having a plurality of threaded holes, and a plurality of threaded fasteners, each of said fasteners being adapted to penetrate one of the through holes in said first and second side plates and thread into one of the threaded holes in said first and second guide plates.

12. A belt tension indicating system, as set forth in claim 1, wherein said reaction plate is held between said slide blocks and said plunger block by a first force exerted by said tensioning means and a second counteracting force exerted by said spring.

13. A belt tension indicating system, as set forth in claim 12, wherein a portion of said first force is applied to said indicating switch through said plunger block.

14. A belt tension indicating system, as set forth in claim 3, wherein said indicating assembly includes an annular seal positioned in said counterbore and in contact with said plunger block and said reaction block.

15. A belt tension indicating system, as set forth in claim 1, wherein said tensioning means includes a hydraulic ram assembly, said ram assembly having a rod portion connected to said idler wheel and a cylinder portion connected to said first and second slide blocks.

16. A belt tension indicating system, as set forth in claim 13, wherein said indicating switch includes means for adjusting the distance between said switch and said plunger block and means for locking said switch in a plurality of positions.

17. A belted work machine, comprising:
   first and second undercarriage assemblies, one on each side of said machine, each undercarriage assembly including a drive wheel, an idler wheel, a supporting frame between the drive and idler wheels, and an endless elastomeric inextensible belt encircling the drive and idler wheels and the supporting frame;
   an indicating assembly for indicating the tension of said belt including first and second slide blocks, a reaction plate, a plunger block, first and second guide plates, a reaction block, a force actuated switch connected to said reaction block, a spring positioned between said plunger block and said reaction block, and means for securing said guide plates to said reaction block; and
   means for tensioning said elastomeric drive belt between said drive wheel and said idler wheel, said tensioning means having a first end connected to said idler wheel and a second end connected to said indicating assembly.

18. A belted work machine, as set forth in claim 17, wherein said spring includes first and second Belleville type springs, said springs being adapted to be compressed between said plunger block and said reaction block.

19. A belted work machine, as set forth in claim 17, wherein said tensioning means includes a hydraulic ram assembly having a rod portion connected to said idler wheel and a cylinder portion connected to said indicating assembly.

20. A belted work machine, as set forth in claim 17, wherein said supporting frame includes first and second spaced plates, said plates defining a space therebetween, said indicating assembly being adapted to be positioned within said space and connected to said side plates.

* * * * *